United States Patent Office 3,184,449
Patented May 18, 1965

3,184,449
LIPID SOLUBLE ANTI-FOLIC MATERIAL AND METHOD OF PREPARING SAME
Thomas J. Bardos, Snyder, and Zislaw F. Chmielewicz, Williamsville, N.Y., assignors to Armour Pharmaceutical Company, Chicago, Ill., a corporation of Delaware
No Drawing. Filed Oct. 24, 1963, Ser. No. 318,496
12 Claims. (Cl. 260—239.5)

The present invention relates to a lipid soluble anti-folic composition and a method of preparing same and more particularly to the preparation of new biologically active compounds designated herein as "pteridinosteroids."

In addition to the preparation of the compounds, this invention is based upon my further discovery that these pteridinosteroids possess lipid solubility and cellular transport properties, characteristic of steroids, while maintaining the inhibitory anti-folic activity of the pteridino derivative. In addition, these compounds may prove useful for their hormonal activities as has been demonstrated for other steroidly fused heterocycles. Further, as shall be shown the compounds of the invention exhibit inhibitory activity against microorganisms.

The material of the present invention is characterized by the formula:

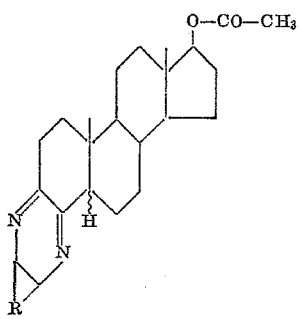

in which R is selected from the group consisting of

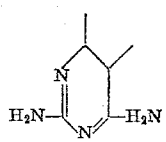

and

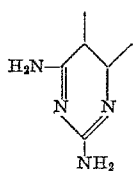

In one practice of the invention, the material may be prepared by heating 4-chlorotestosterone acetate in a mixture of absolute ethanol and glacial acetic acid with a gradual addition of an excess amount of 2,4,5,6-tetra-aminopyrimidine bisulfate over a period of about 36 hours. The reaction, when followed spectrophotometrically, shows the appearance and increasing intensity of an ultraviolet absorption peak in the λ 380–90 micro wave region. The reaction is terminated when the ratio of absorbancies at λ 260/390 reaches a constant value of between 1.5 and 1.6. The reaction mixture is extracted with chloroform and the pteridinosteroid is precipitated by the addition of ether. Final purification is achieved by chromatography on basic alumina (Woelm Gr. 3) followed by several recrystallizations from a mixture of chloroform and methanol and, finally, from chloroform.

The material occurs as yellow needles having a melting point of 273–5°. Analysis.—Calculated for $C_{25}H_{34}O_2N_6$ (450.5); C, 66.65; H, 7.60; N, 18.65. Found: C, 66.64, 66.43; H, 7.68, 7.41; N, 18.49, 18.70.) $[\alpha]_D$—13.5±1 ($CHCl_3$, C, 2.5) and —17±1 (Dioxane, c. 0.1). Ultraviolet $$\lambda_{max.}^{EtOH} \ 240 \ m\mu \ (\epsilon \ 16,980)$$

260 mμ (ε 16,200) and 384 mμ (ε 10,720) by Carey spectrophotometer). Infrared $$\lambda_{max.}^{KBr} \ (microns)$$

2.8, 2.9, 3.0 ($NH$, $NH_2$); 3.3 ($C—H$); 5.78 ($C=O$); 6.2 ($C=N$; 6.35; 6.55 ($NH_2$); 6.85 ($CH_2$; $C—CH_3$); ($CO—CH_3$); 7.5; 8.05 ($C—O$); 9.65; 12.2; 13.0. N.m.r. confirms two angular methyls and an acetyl group. Sodium fusion test for chlorine and Zimmermann color reaction for 3-keto group: negative; Liebermann-Burchardt test: positive.

The material is readily soluble in alcohol and chloroform (ergo: lipid soluble) and is inhibitory in the L. leichmannii assay at 5–20 μg./ml. concentrations which inhibition is completely reversible with 3–20 mμg./ml. folinic acid. This assay was developed by us and reported in J.A.C.S., 77, 4279 (1955). The inhibition is incompletely reversible with higher levels of folic acid. Its inhibition index is 5,000 against folinic acid and thus has about ⅒ the antifolinic activity of 3,4-dimethyl-benzo [1,2-g]-2′,4′-diaminopteridine which is reported by us at J.A.C.S., 79, 4704 (1957).

In animal experiments, our new compound showed no androgenic or myotrophic activities when administered at 5 mg. per day per rat although it showed slight anti-androgenic activity in rats (21% inhibition of 1 microgram of testosterone/day at 5 mg./day) and in a chick assay (30% inhibition). This latter assay was described by Dorfman in Endocrinology, 64, 464 (1959).

In another practice of this invention, 100 ml. of acetic acid and 100 ml. of anhydrous ethanol were placed in a 500 ml. three neck flask, equipped with a reflux condenser, a calcuim chloride drying tube, an immersion thermometer and a magnetic stirrer. The solvent was heated by means of a heating mantle and when the temperature reached 50–55°, 768 mg. of 4-chlorotestosterone acetate was added. Heating and stirring was continued and 250 mg. of 2,4,5,6-tetraamino pyrimidine bisulfite was added when the temperature reached 85°. Further addition of the tetraaminopyrimidine was continued until a total of 1300 mg. had been introduced during a 24 hr. period. The course of the reaction was followed by the ultraviolet spectrum of aliquots taken at various intervals. After all of the tertaaminopyrimidine had been added, heating and stirring was continued for an additional 24 hours, at which time the reaction mixture was cooled, filtered and the clear filtrate (which contained all of the 390 mμ absorbing material) was concentrated to dryness. Yield: 1,050 milligrams of material.

This material was next suspended in 100 ml. of chloroform and filtered. The filtrate which contained 90% of the 390 mμ absorbing material was concentrated to dryness. Yield: 800 mg.

Further purification was accomplished by chromatography. A column containing 20.0 g. of neutral alumina grade 3 (prepared by deactivating grade 1 with 6% water) in chloroform was prepared and the chloroform soluble material was placed on the column.

Results of the chromatogram are as follows:

| Fraction | Solvent | Vol., ml. | Wt., mg. |
|---|---|---|---|
| 1 | Chloroform | 50 | 486.3 |
| 2 | do | 50 | 35.6 |
| 3 | do | 50 | 0.5 |
| 4 | 10% Ethanol in Chloroform | 50 | 126.4 |
| 5 | do | 50 | 8.6 |
| 6 | do | 50 | 0.5 |
| 7 | do | 50 | 0.8 |
| 8 | 25% Ethanol in Chloroform | 100 | 4.3 |
| 9 | 50% Ethanol in Chloroform | 100 | 4.1 |
| 10 | Ethanol | | 3.1 |

The pure chloroform eluates, fractions 1–3 contained unreacted 4-chlorotestosterone acetate. The pteridinosteriod was obtained in the fraction No. 4, in essentially pure form. O.D. (25 μg./ml. as measured by Beckmann D. U. spectrophotometer at λ max 262 mμ=1.04, mix. 388 mμ=0.66, Calculated for $C_{25}H_{34}N_6O_2$ (M.W. 451) $\epsilon_{262}=18{,}761$; $\epsilon_{388}=11{,}980$ $\epsilon_{262}/\epsilon_{388}=1.57$.

This sample gives ½ maximal inhibition in *L. leichmannii* at 1–3 mcg./ml. concentration using the assay described by Bardos et al. at J. Amer. Chem. Soc., 77, 4279 (1955).

Four possible isomeric pteridinosteroids may be produced by the method of this invention, although the predominantly occurring isomer was that designated Ia below.

The four isomers are:

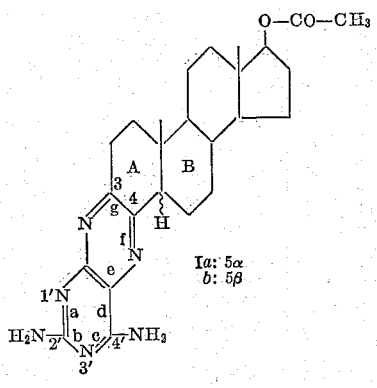

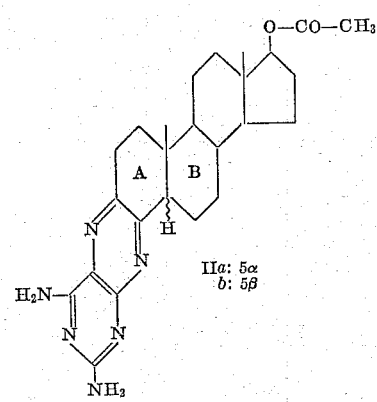

and are, respectively (Ia), 17β-acetoxy-5α-androstano-[4,3-g]-2'-4'-diaminopteridine, (Ib) 17β-acetoxy-5β-androstano-[4,3-g]-2'-4'-diaminopteridine, (IIa) 17β-acetoxy-5α-androstano-[4,3-g]-1'-3'-diaminopteridine and (IIb) 17β-acetoxy-5β-androstano-[4,3-g]-1'-3'-diaminopteridine.

From the foregoing it becomes apparent that a new lipid soluble anti-folic material and method of preparing same have been discovered. And although our disclosure thereof is cast in specifics, it is done so by way of illustration and such modifications, applications and variations as occur to the artisan when confronted with this disclosure are intended within the spirit hereof especially as defined by the scope of the claims appended hereto.

What is claimed is:
1. A compound having the formula

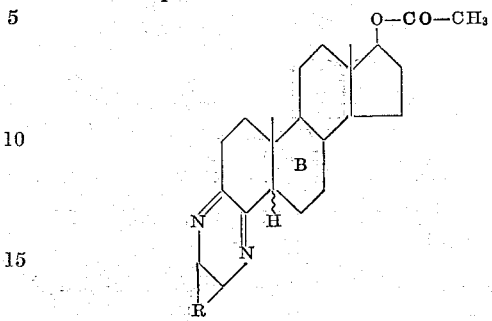

in which R is selected from the group consisting of

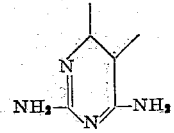

and $H_2N$—pyrimidine—$NH_2$ (structure shown)

2. 17β-acetoxy - 5α - androstano-[4,3-g]-2'-4'-diaminopteridine.
3. 17β-acetoxy - 5β - androstano-[4,3-g]-2'-4'-diaminopteridine.
4. 17β-acetoxy - 5α - androstano-[4,3-g]-1'-3'-diaminopteridine.
5. 17β-acetoxy - 5β - androstano-[4,3-g]-1'-3'-diaminopteridine.
6. The method of preparing a pteridinosteroid comprising heating 4-chlorotestosterone acetate with an excess of 2,4,5,6-tetraaminopyrimidine bisulfate until the ratio of absorbancies at λ 260/390 reaches 1.5–1.6, extracting the reaction mixture with a suitable solvent, adding a precipitator to the extracted product to precipitate the pteridinosteroid.
7. The method of claim 6 in which the solvent is chloroform.
8. The method of claim 6 in which the precipitator is ether.
9. The method of claim 6 in which the 4-chlorotestosterone acetate is heated with the excess 2,4,5,6-tetraaminopyrimidine bisulfate in a mixture of absolute ethanol and glacial acetic acid.
10. The method of claim 9 in which the solvent is chloroform.
11. The method of claim 9 in which the precipitator is ether.
12. The method of preparing a pteridinosteroid comprising heating 4-chlorotestosterone acetate in a mixture of absolute ethanol and glacial acetic acid with a gradual addition of an excess amount of 2,4,5,6-tetraaminopyrimidine bisulfate and terminating the reaction when the ratio of absorbancies at λ 260/390 reaches 1.5–1.6, extracting the reaction mixture with chloroform, and adding ether to the extractant to precipitate said pteridinosteroid.

References Cited by the Examiner

Bardos et al.: Steroids, vol. 2, No. 1, July 1963, pp. 105–110.

LEWIS GOTTS, *Primary Examiner*.